United States Patent [19]

Sebring

[11] Patent Number: 4,852,841
[45] Date of Patent: Aug. 1, 1989

[54] DEVICE FOR CLAMPING THE EDGE OF A TABLE

[76] Inventor: John P. Sebring, 20 School St., Townsend, Mass. 01469

[21] Appl. No.: 256,843

[22] Filed: Oct. 12, 1988

[51] Int. Cl.[4] ............................................. A47B 96/00
[52] U.S. Cl. ..................................... 248/231.5; 24/514
[58] Field of Search ............... 248/231.5, 231.4, 231.7, 248/316.4, 316.5, 225.31; 24/514, 69 R, 493; 403/373; 269/239

[56] References Cited

U.S. PATENT DOCUMENTS

| | | | |
|---|---|---|---|
| 2,990,152 | 6/1961 | Whitney | 248/231.5 |
| 4,575,149 | 3/1986 | Forestal et al. | 248/231.4 X |
| 4,700,437 | 10/1987 | Hoshino | 24/514 X |
| 4,733,842 | 3/1988 | Wilkerson | 248/231.5 |

Primary Examiner—Ramon O. Ramirez
Attorney, Agent, or Firm—M. Lawrence Oliverio

[57] ABSTRACT

A device for clamping the edge of a diagnostic table top includes a C-shaped clamping block which engages the side, top and bottom surfaces at the edge of a table. A fixed jaw engages one of the top and bottom surfaces and an articulatable jaw engages the opposite table surface. The articulatable jaw includes an outer fixed plate and an inner movable plate connected by a pair of dual pivot links at opposite ends of the plates and an activating mechanism including an axially-rotatable vertical shaft with an offset pin. Rotation of the shaft by a lever arm attached thereto causes the pin to push horizontally on the inner plate. The dual pivot links transform the horizontal motion from the pin to a combined horizontal and vertical motion of the inner plate with respect to the outer plate about a circular arc.

11 Claims, 4 Drawing Sheets

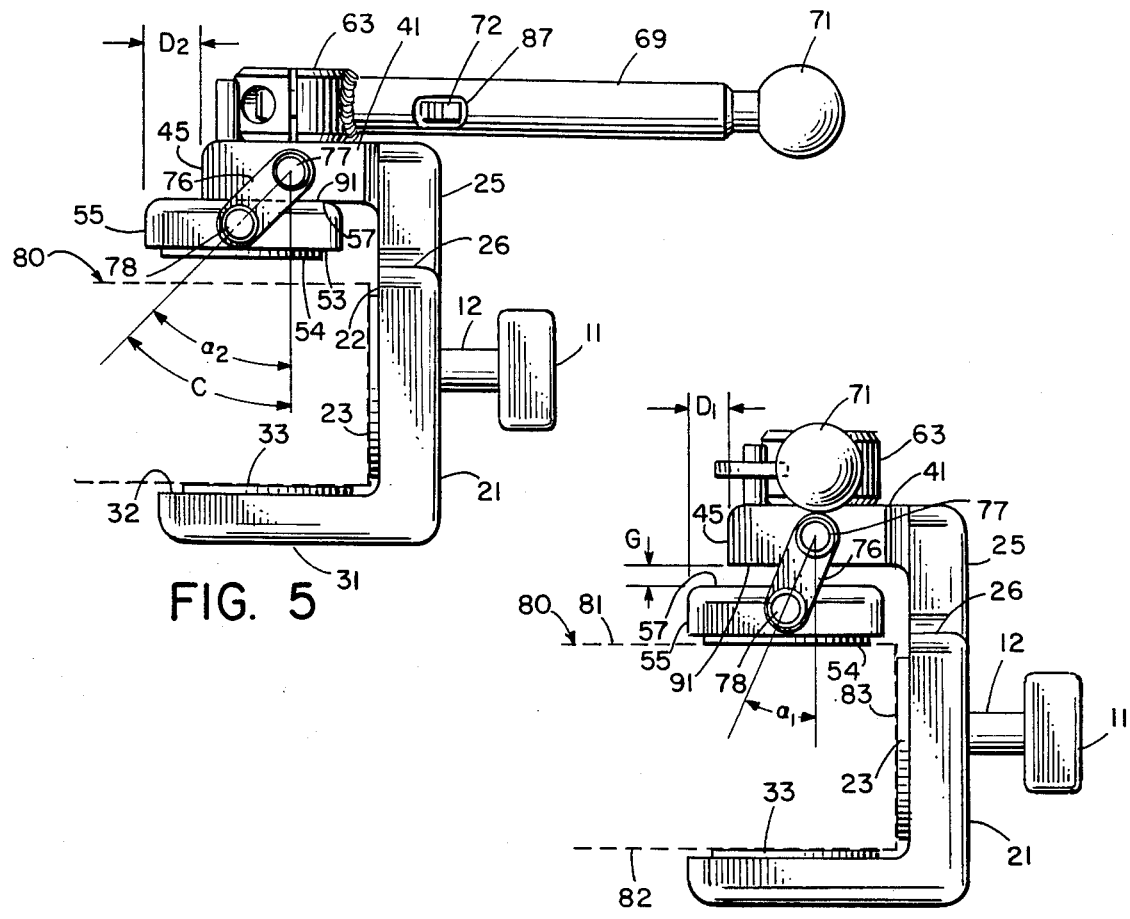
FIG. 5
FIG. 6
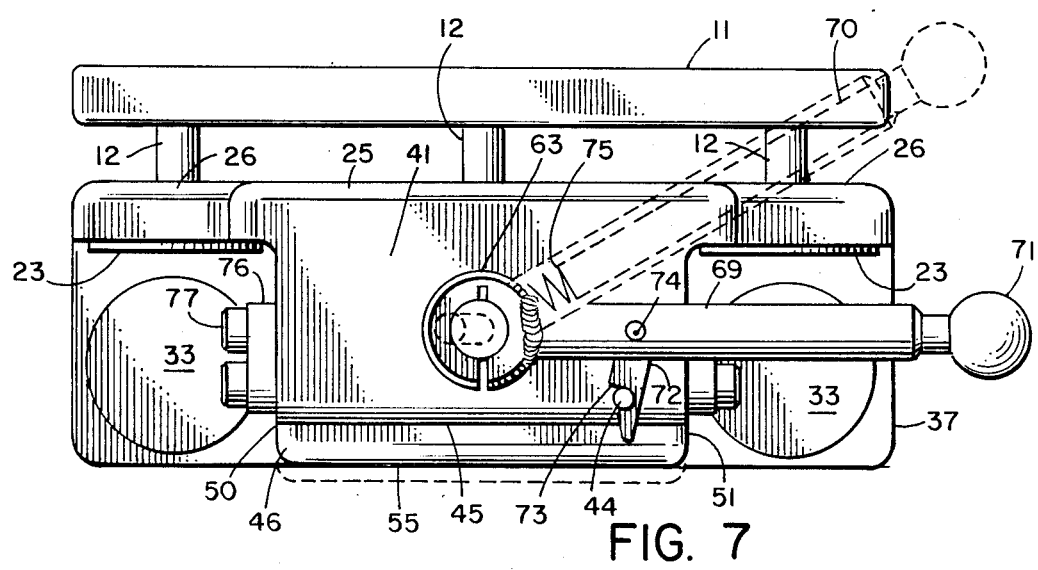
FIG. 7

DEVICE FOR CLAMPING THE EDGE OF A TABLE

BACKGROUND OF THE INVENTION

The present invention relates to devices for clamping the edge of a table and more particularly to a clamping device for use with medical diagnostic tables.

During the course of a medical examination it is generally necessary to mount one or more accessory devices to the diagnostic table, such as poles for holding intravenous fluids, devices for controlling or monitoring the respiratory or other vital bodily functions of the patient, devices for supporting the patient, and many other devices necessary or desirable for assisting the patient or physician simultaneously during the course of the examination.

Diagnostic tables typically include a specially shaped edge to achieve a secure mating with a specially-configured clamp. Such accommodative shaping of the edge of the diagnostic table top is difficult and expensive to produce and may interfere with the output of a given diagnostic machine. For example, as shown in FIG. 9, if a prior art table top having an edge E with a skin thickness T is employed during an X-ray analysis in which X-ray photons A, B, C are projected at and pass through the patient (not shown) lying on the table, the effective skin thickness through which each of photons A, B, and C must penetrate varies greatly and may thus have a greatly varying effect on the degree to which photons A, B, and C are absorbed. Such a variation in absorption by the edge of the table can distort the shadow image of photons which pass through the patient being examined.

It is an object of this invention to provide a clamping device for diagnostic tables which obviates the necessity for specially-shaped table edges and eliminates the attendant excessive costs and problems associated with having to construct specially shaped table top edges and clamping structures therefor.

SUMMARY OF THE INVENTION

In accordance with the invention there is provided a device for clamping the edge of a table top. The device includes a clamping block mechanism having an inside face for abutting the side edge of the table top, a first jaw mechanism fixedly connected to the clamping block having an inner face for abutting the bottom (or top) surface of the table top, and an articulatable second jaw mechanism for abutting the top (or bottom) surface of the table top having an outer plate fixedly connected to the clamping block and an inner plate disposed substantially parallel to the outer plate and movably connected thereto by means of an actuating mechanism. The inner plate is movable from a clamping position wherein it engages the table top to an open position wherein it is spaced from the table top.

The actuating mechanism for the articulatable jaw includes a shaft mechanism aligned along a main vertical axis and extending through a vertical bore in the outer plate. A vertical pin, projecting inwardly from one end of the shaft, is aligned along an offset vertical axis, spaced from the main vertical axis. The pin is movable in a slot formed in the inner plate. A horizontal lever arm extends from the other end of the vertical shaft. The lever arm may be manually rotated in a horizontal plane to cause the shaft to rotate on the main vertical axis and the pin to rotate about the main vertical axis. While thus rotating the pin applies a forward horizontal force against a front edge of the slot in the inner plate. A pair of dual pivot links connecting the side edges of the outer and inner plates transform the horizontal force applied by the pin to a combined horizontal and vertical movement along a circular arc. The actuating mechanism thus provided is easily manipulatable and provides a controlled, even and secure clamping force on the table edge.

The clamping device of this invention further includes a locking mechanism for releasably securing the second jaw mechanism in a clamping position wherein the inner plate is spaced from the outer plate and firmly engages the table top. The locking mechanism preferably includes a spring loaded shaft in the horizontal lever arm, the shaft having a pivotal side arm extending therefrom with a hook at its distal end for releasably engaging a locking post on the fixed outer plate.

The inside face of the clamping block and the inner faces of the jaws are preferably configured to mate with a substantially square-edged table top when the device is in the clamping position. Pads are provided on the mating surfaces to provide a better frictional engagement and prevent scratching of the table top.

BRIEF DESCRIPTION OF THE DRAWINGS

FIG. 5 is a side elevation view of the clamping device of FIG. 1 showing the articulatable jaw in the open position (P3);

FIG. 6 is a side elevation view of the clamping device of FIG. 1 showing the articulatable jaw in the clamping position (P1);

FIG. 7 is a top elevation view of the clamping device of FIG. 1 showing the articulatable jaw in the clamping position (P1) and, in phantom, the lever arm and lower plate in an intermediate position (P2);

DETAILED DESCRIPTION OF THE PREFERRED EMBODIMENT

Figure 1:
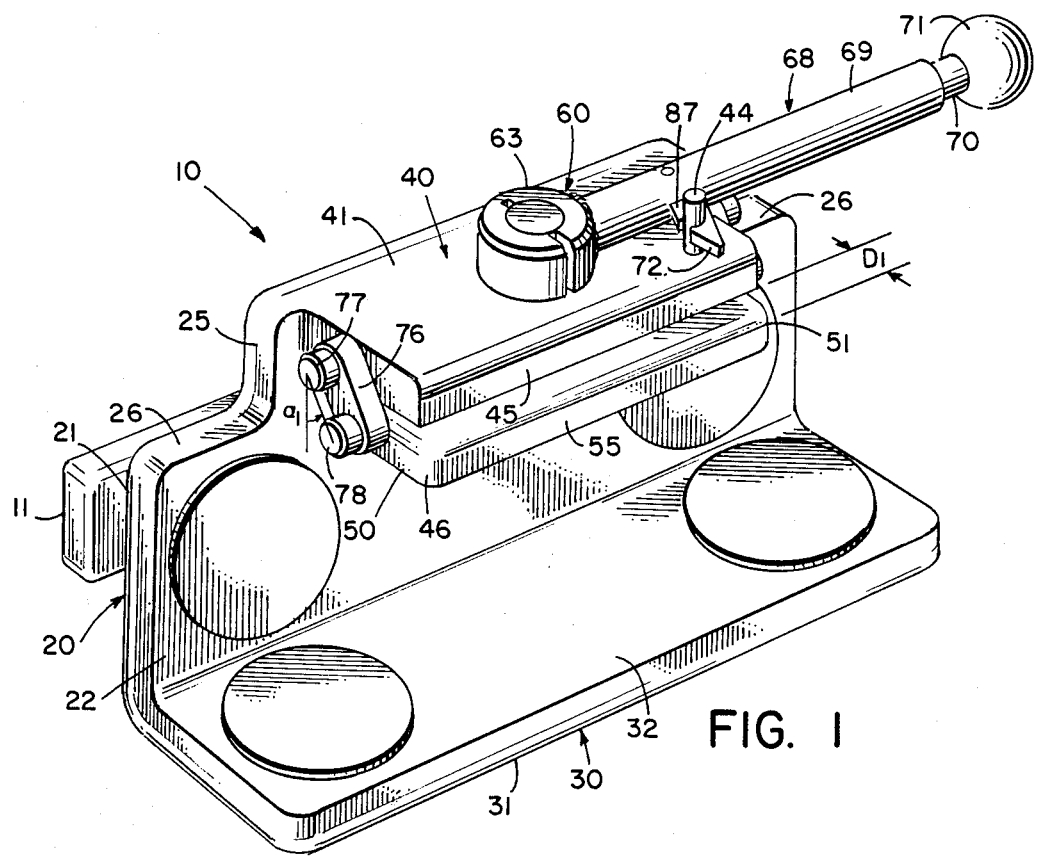
FIG. 1 is a perspective view of a clamping device according to the invention having an articulatable upper jaw shown in a clamping position (P1)

A preferred embodiment of the clamping device 10 of this invention is shown in FIGS. 1–8. The device 10 includes a metal C-shaped clamping block 20 having a vertical side wall 21, a fixed lower jaw 30, and an articulatable upper jaw 40. The lower jaw comprises a fixed horizontal wall 31 extending from the lower end of the vertical side wall 21. The upper articulatable jaw 40 includes a fixed horizontal upper plate 41 extending from the upper end of the vertical side wall 21, a horizontal lower plate 46 movably connected to the upper plate, and an actuating mechanism for controlling movement of the lower plate 46 with respect to the upper plate 41. The actuating mechanism includes a horizontal lever arm 69, a vertical shaft mechanism 60, and a pair of dual pivot links 76, 76 provided at opposing side edges 50, 51 of the upper and lower plates for moving the lower plate 46 along a circular arc between a lowered clamping position P1 (shown in FIGS. 1, 3 and 6) and a raised open position P3 (shown in FIGS. 2, 4 and 5).

A rectilinear table top edge 80 (shown in phantom in FIGS. 5-6) has a horizontal top surface 81, a horizontal bottom surface 82, and a vertical side surface 83. The table top surfaces 81, 82, 83 are releasably engaged by pads 54, 33, 23 on the inner clamping surfaces 53, 32, 23, respectively, of the clamping device 10. The pads are preferably made of a compressible foam material so that upon engaging the table top minor irregularities in the contour or construction thereof are accommodated and the clamp securely engages the table top. A horizontal bar 11 for attaching auxiliary devices to the clamp is disposed along the vertical side wall 21 and is attached thereto by three spaced connecting posts 12.

Each of the dual pivot links 76, connecting the side edges of the upper and lower plates 41, 46, has an upper pivot point 77 at which the link 76 and upper plate 41 are pivotally connected and a lower pivot point 78 at which the link 76 and lower plate 46 are pivotally connected. Link 76 is caused to pivot about upper pivot point 77 by an actuating mechanism described hereinafter which causes lower pivot point 78 to move along a portion of circular arc C, where the center of the arc is defined by the upper pivot point 77 (FIG. 5). This movement of lower pivot point 78 causes lower plate 46 to move from a clamping position P1 engaging the table top wherein pivot point 78 is at a relatively low position and proximal to side wall 21 (FIG. 6), to an open position P3 no longer engaging the table top wherein the pivot point 78 is relatively high and distal from side wall 21 (FIG. 5).

The vertical shaft mechanism 60 includes a vertical shaft 61 aligned along a main vertical axis 62 (FIG. 4) and rotatable in a vertical bore 42 in upper plate 41. Shaft 61 includes a central reduced diameter portion 64 rotatably disposed within bore 42, an enlarged cap 63 at its upper end adjacent the upper surface 90 of upper plate 41, and an enlarged washer 65 at its lower end within a recessed central portion 58 on the lower surface 91 of upper plate 41.

Figure 4:
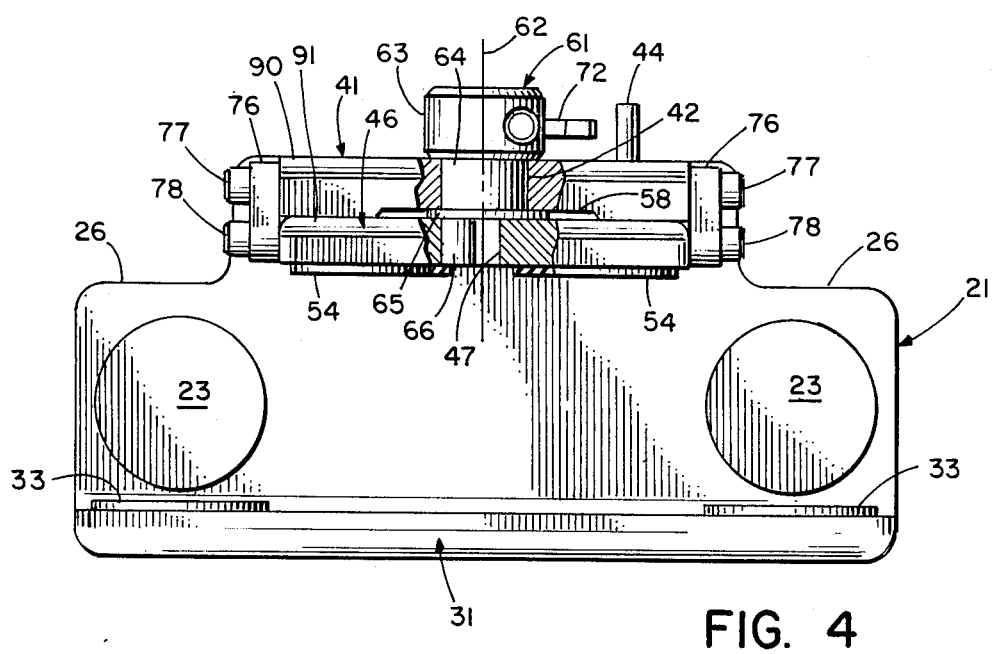
FIG. 4 is a partial cross-sectional, front elevation view of the clamping device of FIG. 1 showing the articulatable jaw in the open position (P3)
Figure 9:
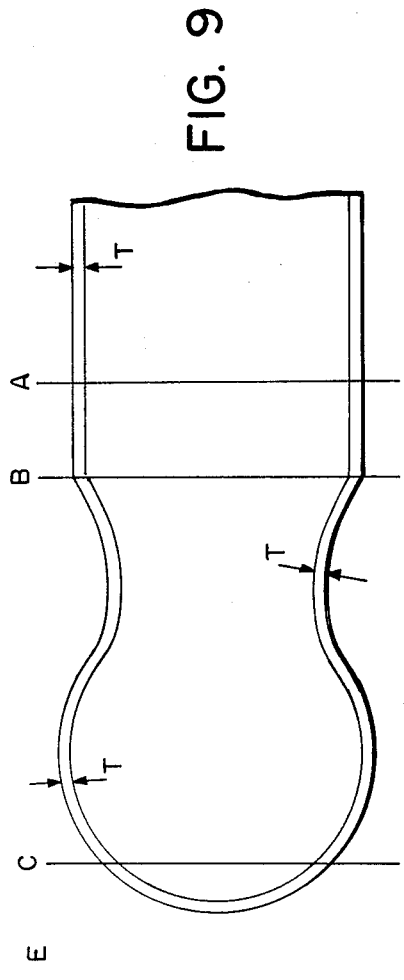
FIG. 9 is a cross-sectional view of a specially-shaped diagnostic table top edge which accommodates a specially shaped prior art clamping device.
Figure 8:
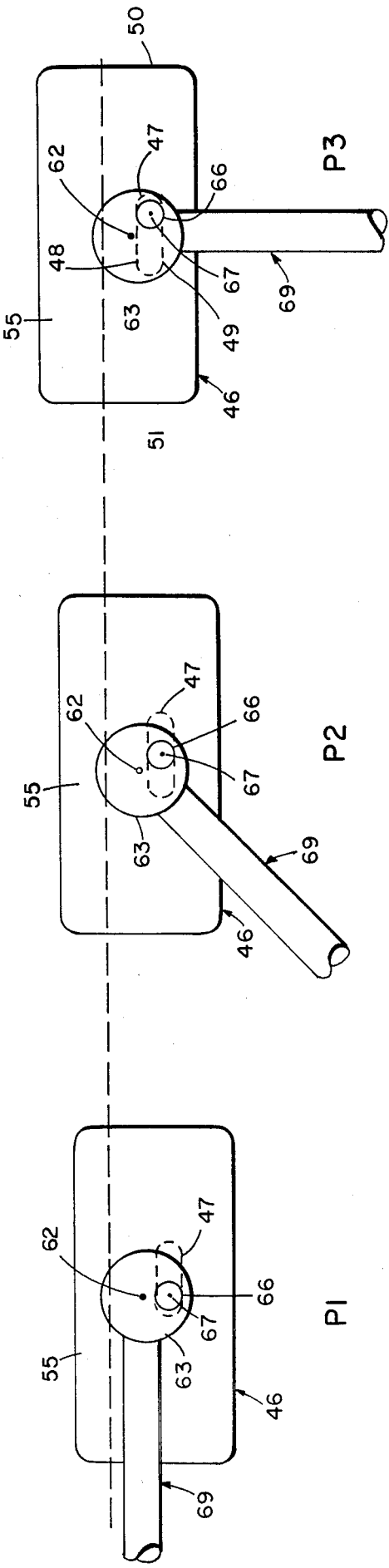
FIG. 8 is a schematic top elevation view of the lever arm, pin, inner plate and slot, showing their relative positioning while the articulatable jaw is in the clamping (P1), intermediate (P2) and open (P3) positions.

A vertical pin 66 extends downwardly from washer 65 which is axially aligned along an offset vertical axis. In the clamping position P1, offset vertical axis 67 is displaced from main vertical axis 62 in a direction proximal to side wall 21 (see FIG. 8). Pin 66 extends into a vertical slot 47 in lower plate 46 (FIGS. 4, 8). Slot 47 is elongated in the transverse direction (i.e., between the right and left ends 50 and 51 of upper and lower plates 41, 46 to which links 76 are connected) and has a front surface 48 and rear surface 49, wherein rear surface is proximal side wall 21 (FIG. 8). The movement of pin 66 and its engagement with slot 47 causes movement of lower plate 46 with respect to upper plate 41 as described hereinafter.

A horizontal lever arm 68 extends from the cap 63 at the upper end of shaft 61. Rotation of lever arm 68 in a horizontal plane causes shaft 61 to rotate on its vertical axis 62 in the vertical bore 42. Arm 68 includes an outer tube 69 having a central bore in which an inner shaft 70 is axially movable. Inner shaft 70 is spring-biased outwardly from cap 63 by an internal spring 75 at the proximal end of inner shaft 70 (shown in phantom in FIG. 7). A side arm 72 is pivotally connected at its proximal end to inner shaft 70. Arm 72 extends through a slot 87 in outer tube 69. Axial movement of shaft 70 in tube 69 causes arm 72 to pivot about its proximal end 74 as arm 72 is engaged by the edge of slot 87. Arm 72 has a hook 73 at its distal end for releasably engaging a vertical post 44 projecting from the upper surface 90 of upper plate 41. When the hook engages post 44, lever arm 68 is in a locked position and upper jaw 40 is in the clamping position P1 (FIG. 1). To release hook 73 from post 44, the user pushes inwardly on knob 71 on the distal end of inner shaft 70 causing the inner shaft 70 to move axially inward toward cap 63 and arm 72 to pivot about point 74 so that hook 73 moves outwardly away from cap 63 to disengage post 44. Lever arm 68 can then be rotated in a horizontal plane about cap 63 through an intermediate position P2 to the open position P3. The recessed square shoulders 26 provided on each upper corner of side wall 21 define a central flange 25 and allow clearance for the user's fingers when engaging and rotating lever arm 68.

The relative movement of the various components will now be described when the upper articulating jaw is caused to be moved from the clamping P1 to the open position P3.

Figure 3:
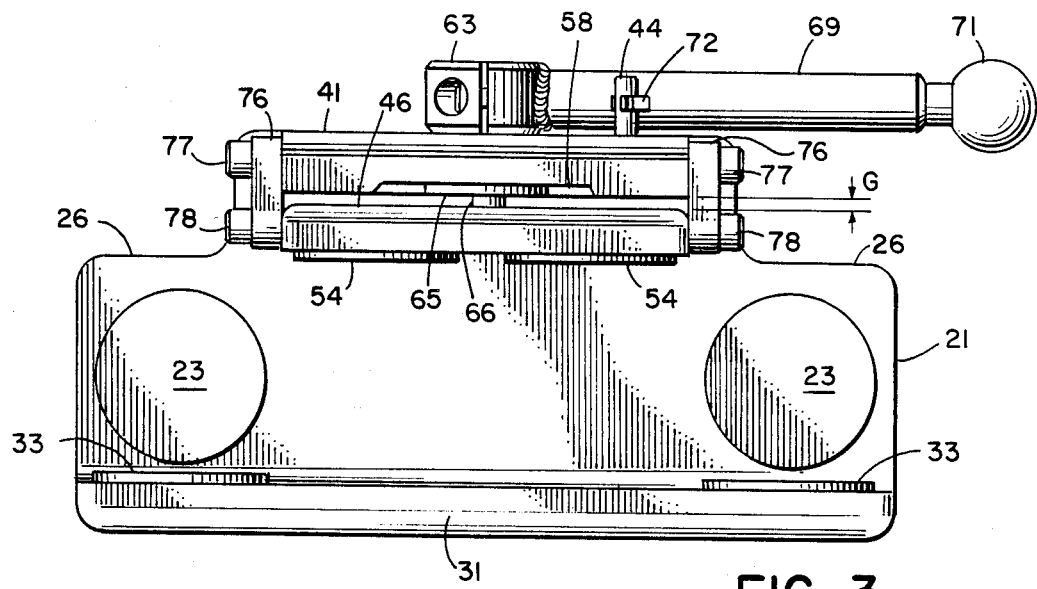
FIG. 3 is a front elevation view of the clamping device of, FIG. 1 with the articulatable jaw in the clamping position (P1)

In the lowered clamping position P1 shown in FIGS. 1, 3 and 6, the upper surface 57 of lower plate 46 is spaced from the lower surface 91 of upper plate 41 by a vertical distance G. The front edge 55 of lower plate 46 is forward of the front edge 45 of upper plate 41 by a horizontal distance D1 (by "front" is meant distal from side wall 21). The lower pivot point 78 is disposed at an angle $\alpha_1$ with respect to a vertical line passing through fixed upper pivot point 77. Lever arm 68 lies parallel to side wall 21. Pin 66 is disposed at the right end of slot 47 in lower plate 46 (FIG. 8).

To open the upper jaw, hook 73 is first disengaged from post 44 by pushing inwardly on knob 71. Lever arm 68 is then rotated counter-clockwise (as viewed from the top) which causes pin 66 at the lower end of shaft 61 to rotate about main vertical axis 62 wherein pin 66 moves forwardly pushing against the front edge 48 of slot 47 and thereby causing the front edge 55 of lower plate 46 to move forwardly (away from side wall 21) and upwardly (towards upper plate 41). At an intermediate position P2, shown in FIG. 8, pin 66 is centrally disposed within slot 47.

Figure 2:
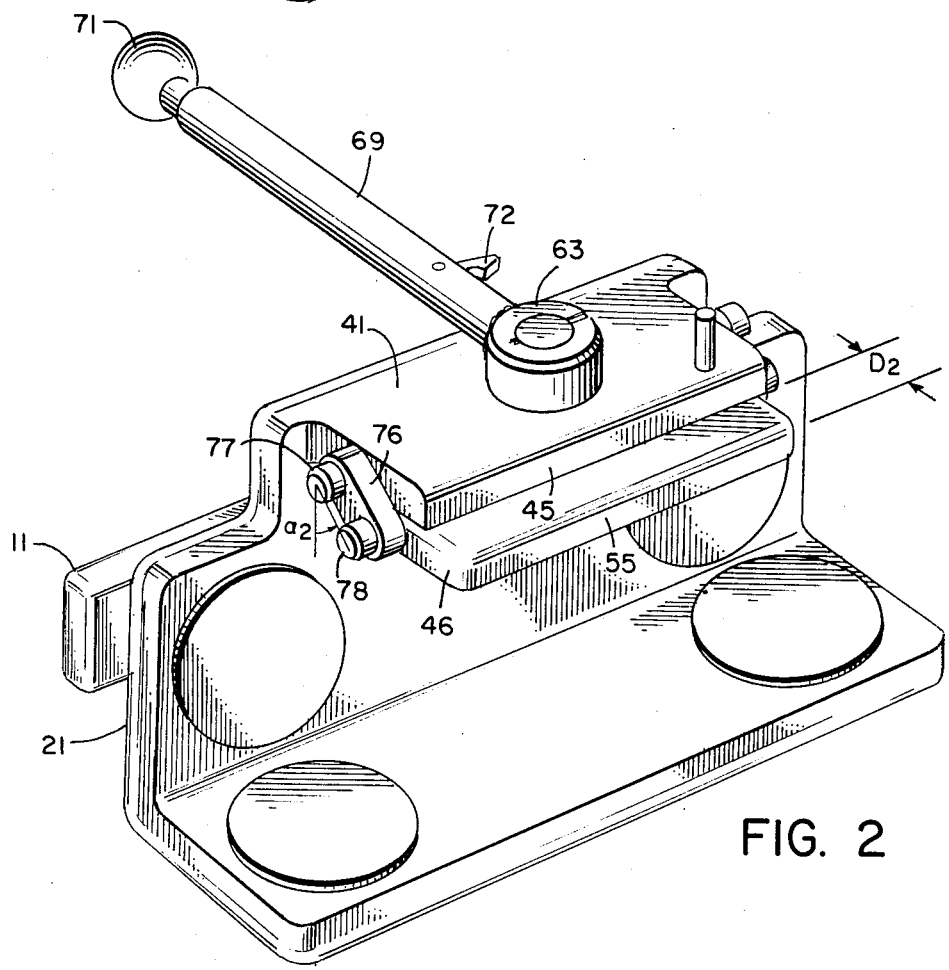
FIG. 2 is a perspective view of the clamping device of FIG. 1 showing the articulatable jaw in an open position (P3)

Lever arm 68 is then moved further counter-clockwise in a horizontal plane to a position 90° from the starting position wherein articulatable jaw 40 is in the open position P3, shown in FIGS. 2, 4 and 5. The upper surface 57 of lower plate 46 now engages the lower surface 91 of upper plate 41, so that space vertical G has been eliminated. The front edge 55 of lower plate 46 is now displaced more forwardly of the front edge 45 of upper plate 41 by a horizontal distance D2 (where D2 is greater than D1). Lower pivot point 78 is more forward of upper pivot point 77 by an angle $\alpha_2$ defined from the vertical as shown in FIG. 5, wherein $\alpha_2$ is greater than $\alpha_1$. Pin 66 is now disposed at the left end of the slot 47 as shown in FIG. 8. The dashed line in FIG. 8 shows the forward movement of front edge 55 of inner plate 46 as it moves from clamping position P1 to open position P3.

In the preferred embodiment described herein, substantially all of the components are made of metal, except for the foam pads 23, 33 and 54 for engaging the table top surfaces, and the knob 71 which is made of plastic. A structurally rigid, compact and durable clamping device 10 is thus provided which applies an even and substantial frictional engaging force for secure attachment to the table. The clamp may alternatively be arranged wherein the articulatable jaw is provided at the bottom rather than top of the table.

Although a preferred embodiment of the invention has hereinbefore been described, variations of the invention will be perceived by those skilled in the art, which variations are nevertheless within the scope of the invention as defined by the claims appended hereto.

What is claimed is:

1. A device for clamping the edge of a table top comprising:
   a clamping block having a substantially vertical inside face for abutting the side surface of the table top;
   a first jaw means connected to the clamping block having a substantially horizontal first inner face for abutting one of the top and bottom surfaces of the table top;
   a second articulatable jaw means having an outer plate connected to the clamping block and an inner plate movably attached to the outer plate, the inner plate having a substantially horizontal second inner face spaced from the first inner face for abutting the other of the top and bottom surfaces of the table top;
   a vertical bore in the outer plate aligned along a vertical axis;
   a vertical edge surface on the inner plate offset from the vertical axis;
   an actuating means for moving the inner plate along a substantially circular arc between a clamping position in which the inner plate engages the table top and an open position in which the inner plate is spaced from the table top, the actuating means comprising at least one dual pivot link having an outer pivot point at which the link and outer plate are pivotally connected and an inner pivot point at which the link and inner plate are pivotally connected, a vertical shaft means rotatable in the bore of the outer plate on the vertical axis, a vertical pin extending from the shaft means and disposed adjacent the offset edge surface on the inner plate, and a lever arm extending from the shaft for rotating the shaft on the vertical axis and causing the offset pin to move horizontally and engage the offset edge for pushing horizontally on the inner plate, wherein the pivot link transforms the horizontal force applied by the pin to a combined horizontal and vertical motion of the inner plate along a circular arc having a center defined by the outer pivot point.

2. The device of claim 1, further including a locking means for releasably securing the second jaw means in the clamping position.

3. The device of claim 2, wherein the locking means comprises a locking post disposed on the outer plate, a spring loaded shaft axially movable within the lever arm, a slot in the lever arm, and a side arm disposed in the slot which is pivotally connected at one end to the spring-loaded shaft and has a hook means on its other end for releasably engaging the locking post.

4. The device of claim 1, wherein the at least one dual pivot link maintains the outer and inner plates in substantially parallel alignment.

5. The device of claim 4, wherein the inner pivot point is disposed along the centerline of the inner plate.

6. The device of claim 1, wherein the lever arm is horizontally disposed.

7. The device of claim 1, wherein the inside face of the clamping block and the first and second inner faces of the first and second jaw means are configured to mate with a substantially square edged table top when the device is in the clamping position.

8. The device of claim 1, including support means attached to the clamping block and disposed substantially parallel to the side edge of the table top for attaching auxiliary devices to the clamping device.

9. The device of claim 1, wherein the vertical edge surface comprises a slot in the inner plate.

10. The device of claim 1, wherein the clamping block comprises a vertical side wall having recessed portions to facilitate access to and rotation of the lever arm.

11. The device of claim 1, wherein the second articulatable jaw means is disposed adjacent the top surface of the table top.

* * * * *